(12) United States Patent
Chang

(10) Patent No.: US 10,030,570 B1
(45) Date of Patent: Jul. 24, 2018

(54) WORK VEHICLE

(71) Applicant: KUBOTA CORPORATION, Osaka (JP)

(72) Inventor: Eric Chang, Buford, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/596,327

(22) Filed: May 16, 2017

(51) Int. Cl.
*F01P 1/02* (2006.01)
*B60K 5/12* (2006.01)
*B60K 11/06* (2006.01)

(52) U.S. Cl.
CPC ...... *F01P 1/02* (2013.01); *B60K 5/12* (2013.01); *B60K 11/06* (2013.01); *B60Y 2200/223* (2013.01)

(58) Field of Classification Search
CPC ...... F01P 1/02; F01P 1/06; B60K 5/12; B60K 11/06; B60K 11/08; B60Y 2200/223
USPC ............ 180/68.1, 68.2, 291, 292, 299
See application file for complete search history.

(56) References Cited

U.S. PATENT DOCUMENTS

| | | | | |
|---|---|---|---|---|
| 5,207,187 A * | 5/1993 | Kurohara | ............ | B60K 11/06 123/41.7 |
| 5,284,115 A * | 2/1994 | Imanishi | ............ | B60K 11/00 123/198 E |
| 5,689,953 A * | 11/1997 | Yamashita | ............ | B60K 11/02 123/41.49 |
| 9,155,245 B2 | 10/2015 | Jordan et al. | | |

* cited by examiner

*Primary Examiner* — John D Walters
(74) *Attorney, Agent, or Firm* — Greenblum & Bernstein, P.L.C.

(57) ABSTRACT

In a work vehicle, an engine is mounted on an engine mounting face formed in an engine mounting member connected to a vehicle body frame. A gap is formed between a lower end of an engine hood covering the engine from above and the vehicle body frame. An air deflector is provided for guiding cooling air current flowing downwards along a side face of the engine toward the engine mounting face to the gap.

7 Claims, 6 Drawing Sheets

WORK VEHICLE

TECHNICAL FIELD

The present invention relates to a work vehicle having an engine cooled by cooling air current.

BACKGROUND ART

U.S. Pat. No. 9,155,245 discloses a lawn mower that mounts an engine having an engine output shaft caused to project downwards from a lower face of an engine body. This engine is mounted on a mount plate fixed to a pair of left and right main frames. In this, the engine output shaft extends downwards through an opening formed in the mount plate. The opening has a shape sized greater than an output pulley attached to the engine output shaft. The mount plate defines also a plurality of through holes, in addition to the opening. On the top face of the engine body, a fan is provided. Downwardly oriented air current generated by this fan cools the engine. The air current as passing the engine is heated to become hot air current, and a portion of this hot air current passes through the through holes to reach a belt pulley and/or a belt acting as an engine output portion and the hot air current moves further towards the ground surface. Direct contact of such hot air current past the engine with the belt pulley or the belt is undesirable. For, when the lawn mower is performing a lawn mowing operation, this hot air current can damage the lawn.

U.S. Pat. No. 5,284,115 also discloses a lawn mower mounting an engine having an engine output shaft projecting downwards from the lower face of the engine body. The engine is mounted on a plate-like vehicle body frame. In this, the engine output shaft extends downwards through an opening defined in the mounting member. This opening also has a shape sized greater than an output pulley attached to the engine output shaft. In order to inhibit an engine room from becoming a high temperature, hot air current past the engine is discharged via a gap formed between a muffler hood and the vehicle body frame, a gap formed between an engine hood side plate and the vehicle body frame and a gap formed between the engine output shaft and the opening. Below the vehicle body frame, more particularly, below the opening, there is provided a guide plate for guiding hot air current past through the opening sideways. In this lawn mower, as the guide plate is disposed between the vehicle body frame and the engine output pulley, direct collision of the hot air current against the ground surface is suppressed, but a space is required to dispose the guide plate below the opening.

SUMMARY OF INVENTION

The object of the present invention is to provide a work vehicle capable of discharging hot air current in an efficient manner from an engine room surrounded by an engine hood and an engine mounting face.

For accomplishing the above-noted object, a work vehicle comprises:
 a vehicle body frame;
 an engine;
 an engine mounting member having an engine mounting face, the engine mounting member being connected to the vehicle body frame;
 an engine hood configured to cover the engine from above, a lower end of the engine hood and the vehicle body frame together forming a gap therebetween; and
 an air deflector configured to guide cooling air flowing downwards along a side face of the engine toward the engine mounting face to the gap.

With the above-described arrangement, in the engine room surrounded by the engine mounting member and the engine hood, heated cooling air current (hot air current) flowing downwards along the side face of the engine is discharged through a gap formed between the lower end of the engine hood and the vehicle body frame. In this, the hot air current (cooling air current) flowing downward toward the engine mounting face is changed in its direction towards the gap by means of the air deflector. By the action of this air deflector, much of the hot air current flowing downwards along the engine side face is discharged through the gap formed between the lower end of the engine hood and the vehicle body frame. As a result, it is possible to avoid undesirable phenomenon that the cooling air current that has flown downwards along the engine side face is reflected by the engine mounting face, thus being directed upwards again to stay inside the engine room thereby to raise the temperature of the engine room. As the hot air current generated in the engine room is discharged through the gap formed between the lower end of the engine hood and the vehicle body frame, contact of the hot air current with the ground surface can be suppressed also.

In case the engine output shaft projects from the lower face of the engine, a through hole for allowing passage of the engine output shaft therethrough is formed at the center of the engine mounting face of the engine mounting member. In order to reduce the amount of hot air current escaping through between the through hole and the engine output shaft, it will be advantageous that the gap formed between the through hole and the engine output shaft be of such an amount that allows avoidance of contact between the through hole and the engine output shaft and/or one end of the air deflector extends to the side face of the engine body.

DETAILED DESCRIPTION

Next, a lawn mower as one embodiment of a work vehicle relating to the present invention will be explained with reference to the accompanying drawings.

This lawn mower is configured as a riding type lawn mower having a pair of left and right front wheels 1, a pair of left and right rear wheels 2 and a vehicle body frame 1 supported by the front and rear wheels 1, 2. In this detailed description, unless indicated otherwise, a term "front (forward)" means a front (forward) side with respect to the vehicle body front/rear direction (traveling direction), and a term "rear" means a rear side with respect to the vehicle body front/rear direction (traveling direction). Further, a left-right direction or lateral direction means a vehicle body transverse direction (vehicle body width direction) perpendicular to the vehicle body front/rear direction. A term "upper" or "lower" refers to positional relationship in the perpendicular direction of the vehicle body (vertical direction) and represents a relationship in the respect of the ground-clearance.

Figure 1:
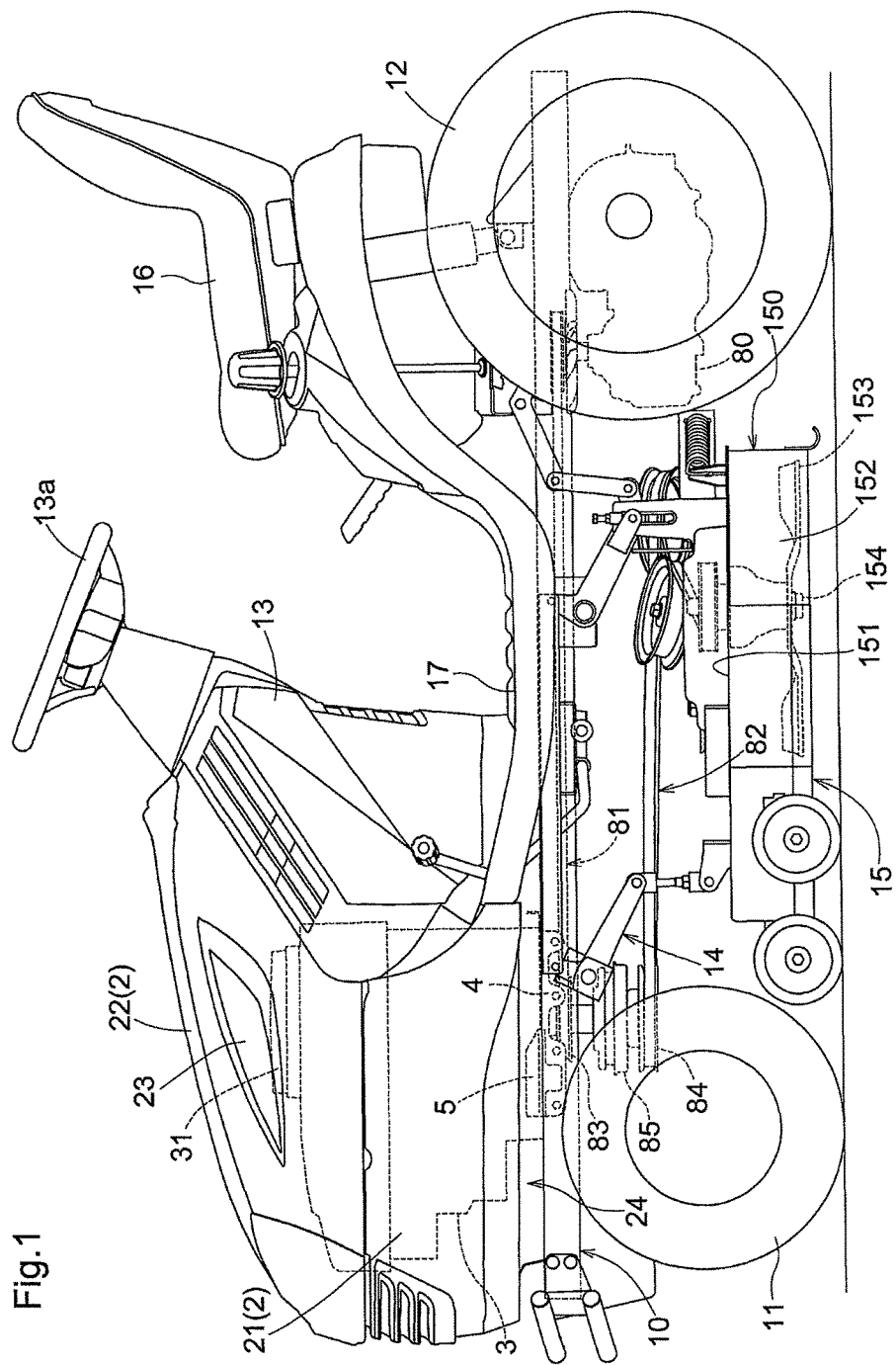
FIG. 1 is a side view of a lawn mower as one embodiment of a work vehicle.
Figure 2:
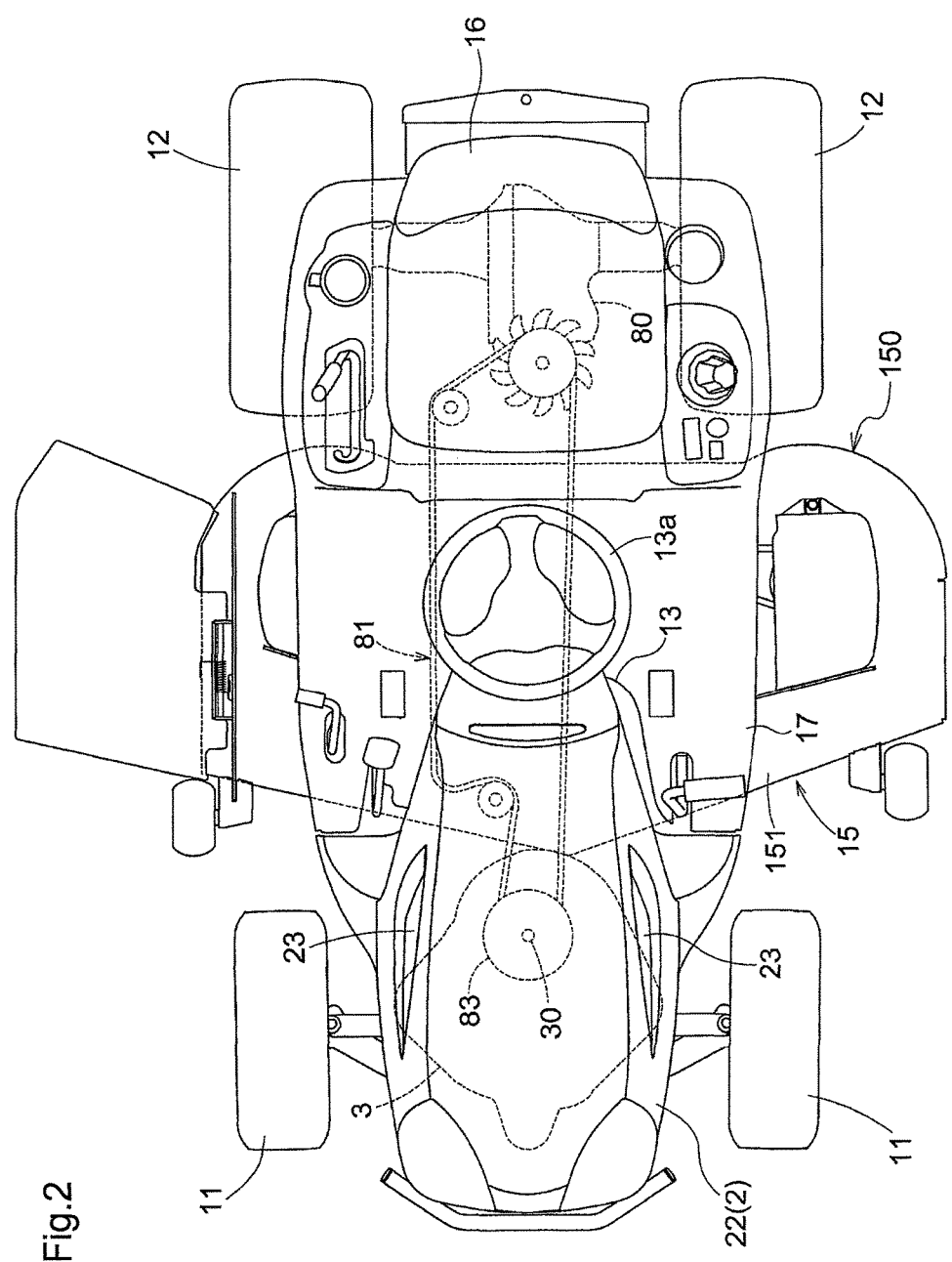
FIG. 2 is a plane view of the lawn mower.

As shown in FIG. 1 and FIG. 2, the lawn mower includes a vehicle body frame comprised of a pair of left and right longitudinal beams 10a extending in the vehicle body front/rear direction and cross beams interconnecting them. The vehicle body frame 10 mounts the front wheels 11 which are steered by a steering wheel 13a supported to a handle post panel 13 and the rear wheels 12 which receive speed-changed power via a stepless speed changer device 80. Under this vehicle body frame 10 and between the front wheels 11 and the rear wheels 12, there is disposed a mower unit 15 which is suspended to be parallel liftable up/down via a link type lift mechanism 14. At a front portion of the vehicle body frame 10, a vertical shaft type engine 3 is mounted. This engine 3 is covered from above by an engine hood 2. A rear opening of the engine hood 2 is closed by the handle post panel 13. In this embodiment, the engine hood 2 and the handle post panel 13 together form an engine room. Further, upwardly of the vehicle body frame 10, there is disposed a floor panel 17 which extends from the handle post panel 13 to the upper side of the rear wheels 12. At a rear portion of the floor panel 17, a driver's seat 16 is provided. Downwardly of the floor panel 17, there are disposed a first belt transmission mechanism 81 for transmitting power from the engine 3 to the stepless speed changer device 80 and a second belt transmission mechanism 82 for transmitting power from the engine 3 to the mower unit 15. A speed changing ratio of the stepless speed changer device 80 is varied, based on an operational amount of a speed changer operational tool operated by the driver.

Figure 3:
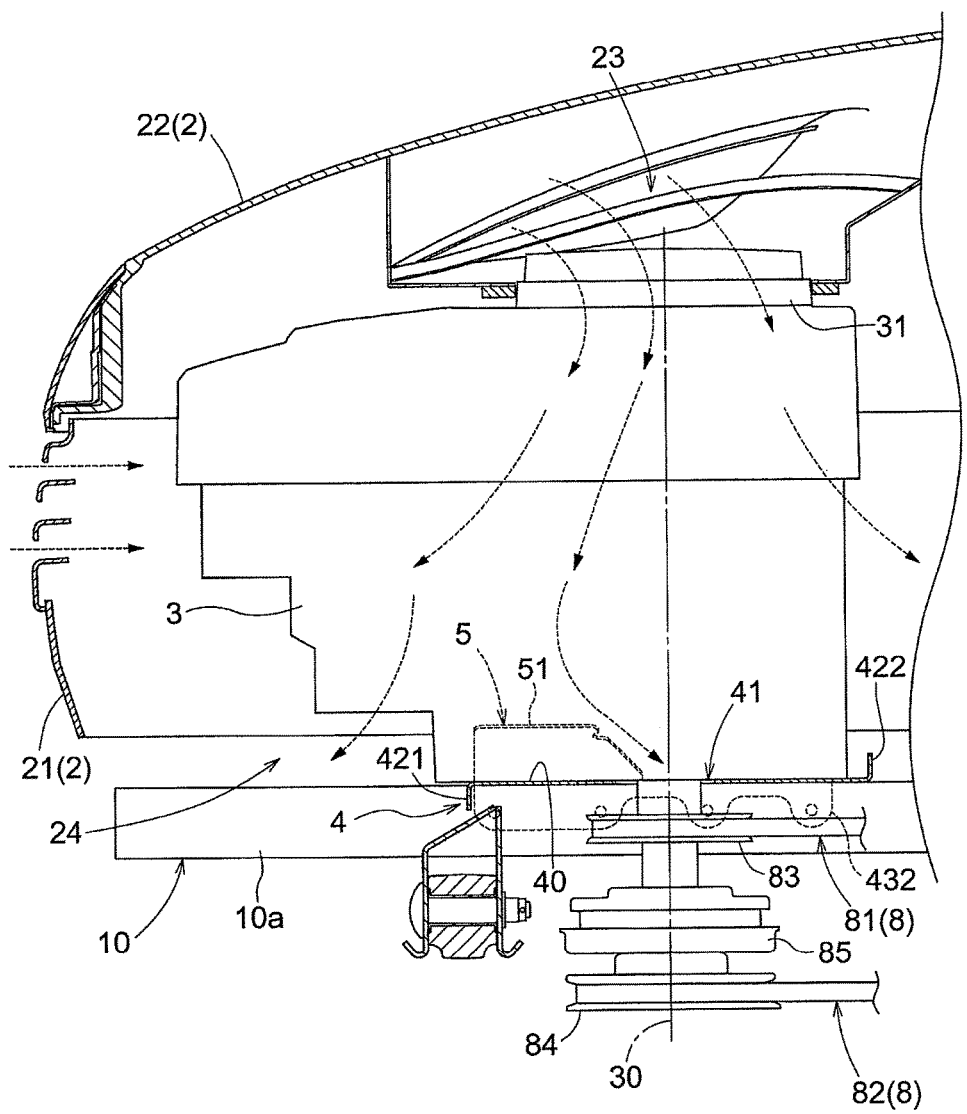
FIG. 3 is a schematic side view of an engine room showing cooling air current flowing in the engine.

As shown in FIG. 3, the engine 3 has an engine output shaft 30 projecting from its lower face. And, the engine 3 is disposed such that the engine output shaft 30 extends in the vertical direction. Upwardly of the engine 3, there are provided a fan unit 31 consisting of a fan for taking off power from an upper part of the engine output shaft 30 and a fan case shrouding this fan. The lower portion of the engine output shaft 30 projects to the lower side of the vehicle body frame 10. Downwardly of the engine output shaft 30, there are provided a first pulley 83 of the first belt transmission mechanism 81 and a second pulley 84 of the second belt transmission mechanism 82. Between the first pulley 83 and the second pulley 84, there is provided a PTO clutch 85 for switching ON/OFF transmission of engine power to the second belt transmission mechanism 82.

Figure 4:
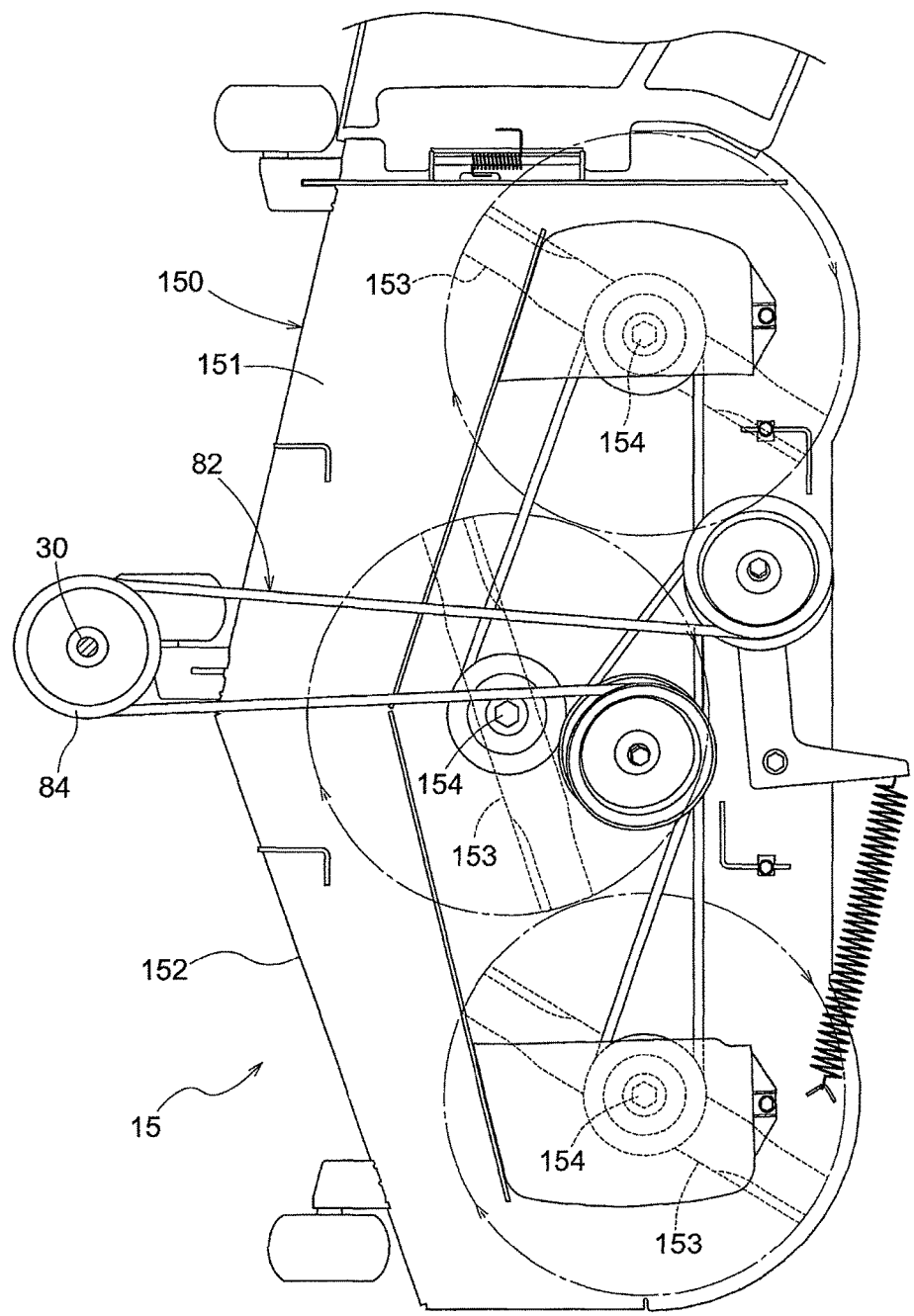
FIG. 4 is a plane view of a mower unit.

As shown in FIG. 1 and FIG. 4, the mower unit 15 includes a mower deck 150 comprised of a ceiling plate 151 and a side plate 152. In an inner space created by the ceiling plate 151 and the side plate 152 of the mower deck 150, three plate-like blades 153 are accommodated in juxtaposition along the vehicle body transverse direction. Each blade 153 is fixed to a lower end of one of three blade rotary shafts 154 rotatably supported to the ceiling plate 151 of the mower deck 150. The respective blade rotary shafts 154 extend vertically upward through the ceiling plate 151 of the mower deck 150.

Figure 5:
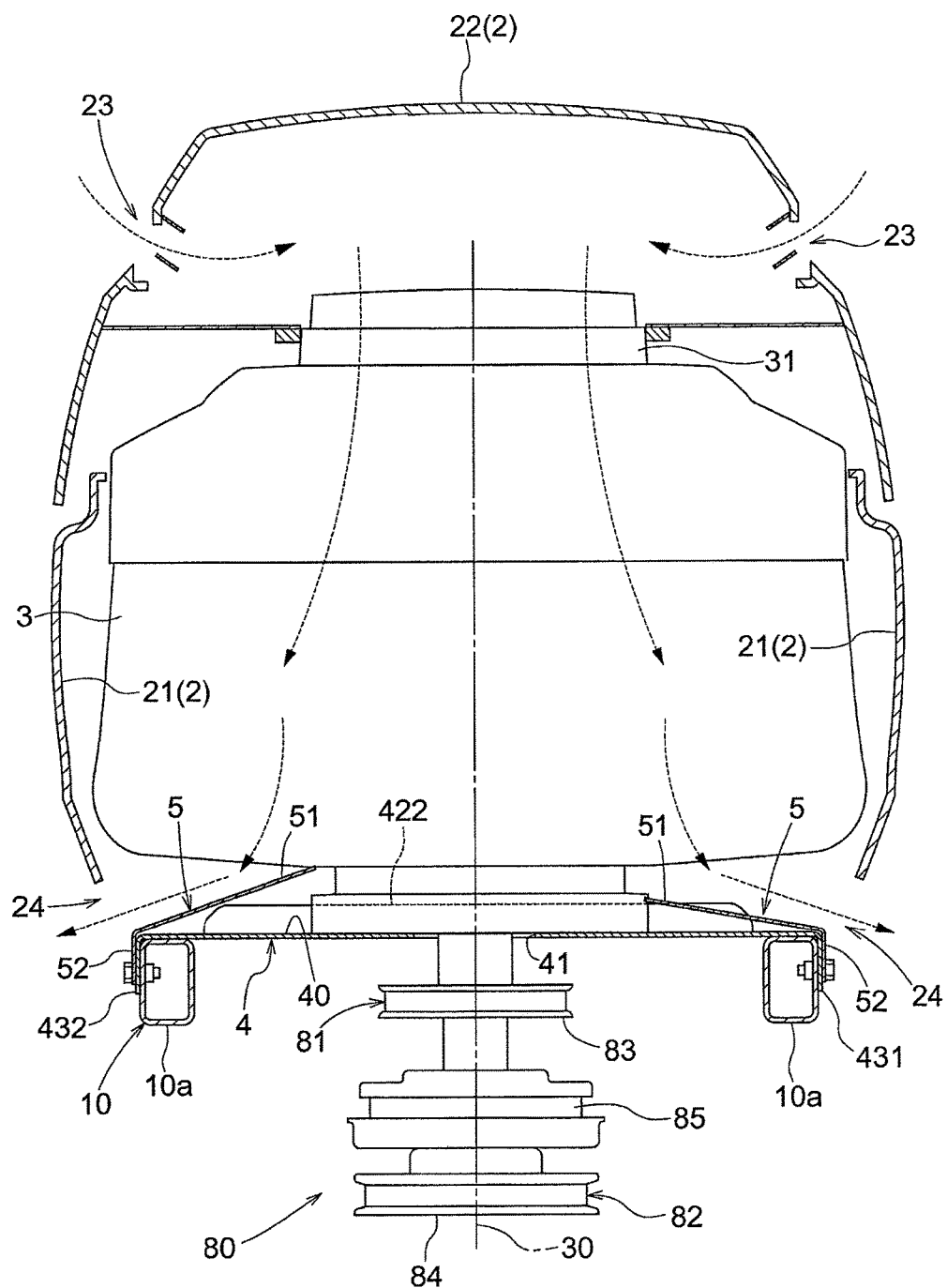
FIG. 5 is a schematic front view of the engine room showing cooling air current flowing in the engine.

As shown in FIG. 5, the engine 3 is mounted on an engine mounting member 4 fixed to the vehicle body frame 10. The engine hood 2 shrouding the engine 3 consists of a lower hood 21 fixed to the vehicle body frame 10 and an upper hood 22 supported to the vehicle body frame 10 to be openable. The upper hood 22 defines an inlet hole 23 for introducing fresh air from the ambience. Between the lower end of the lower hood 21 and the vehicle body frame 10, a gap (outlet hole) 24 is formed for discharging cooling air current heated by the engine (hot air current) to the outside. Fresh air introduced via the inlet hole 23 into the engine room flows as a cooling air current from above the engine 3 to under this engine 3, thus cooling the engine 3 and engine accessories and then is discharged as hot air current from the engine room.

Figure 6:
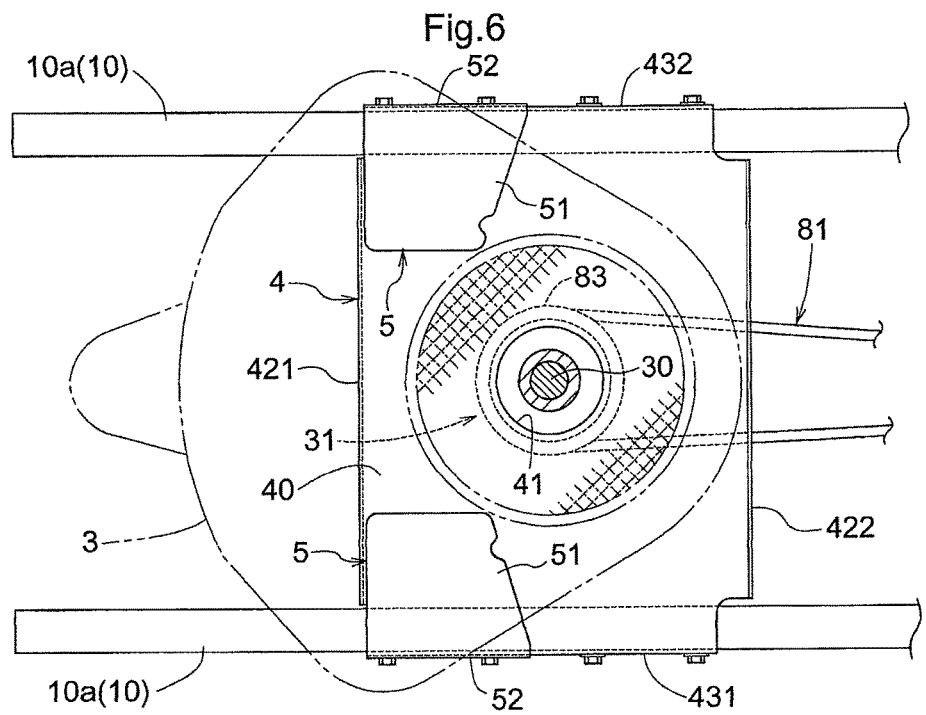
FIG. 6 is a plane view showing an engine mounting member and an air deflector.
Figure 7:
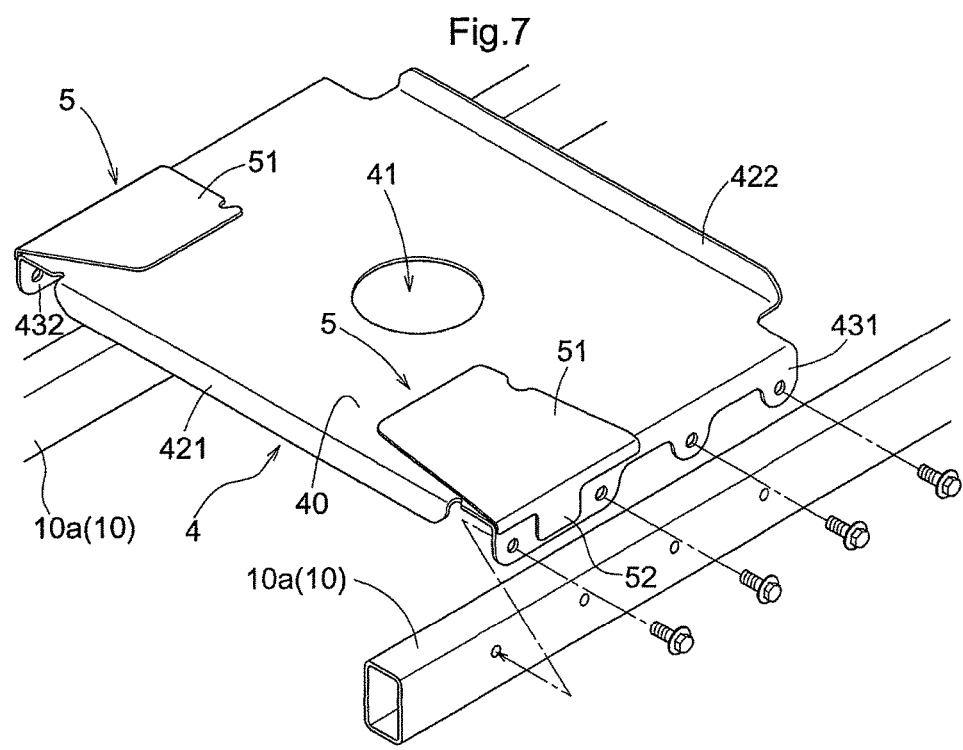
FIG. 7 is a perspective view showing the engine mounting member and the air deflector.

As shown in FIG. 5, FIG. 6 and FIG. 7, the engine mounting member 4 is a steel plate made by sheet-metal working. The engine mounting member 4 has a through hole 41 for allowing passage of the engine output shaft 30 therethrough, the through hole 41 being formed in a center horizontal face of the engine mounting member 4 which face acts as an engine mounting face 40. The through hole 41 has a size which is designed to allow formation of a gap between the inner circumferential edge of the through hole 41 and the engine output shaft 30, more particularly, a gap of such degree as allows only avoidance of mutual interference therebetween. Thus, it is possible to avoid the phenomenon that the cooling air current (hot air current) which has flown downward along the side face of the engine 3 flows directly toward the ground surface, thereby damaging lawn or the like.

A front end portion 421 and a rear end portion 422 of the engine mounting member 4 are formed as bent ribs configured to enhance strength of the engine mounting face 40. A left end portion 431 and a right end portion 432 of the engine mounting member 4 are bent at a right angle substantially so as to wrap around the longitudinal beams 10a of the vehicle body frame 10 formed of angular pipes having a square-shaped cross section. In the instant embodiment, the left end portion 431 and the right end portion 432 are bolt-fixed to the outer side face of the corresponding angular pipe.

Further, an air deflector 5 configured to change the direction of the cooling air current (hot air current) flowing downward along the side face of the engine 3 towards the engine mounting face 40 to guide it to the gap 24 is fixed to the longitudinal beams 10a on the opposed sides of the engine 3, more particularly, to the left end portion 431 and the right end portion 432 of the engine mounting member 4. In the instant embodiment, the air deflector 5 is a steel plate made by sheet-metal working, which is bent and sectioned into a main body portion 51 and an end portion 52. The end portion 52 of the air deflector 5 is wound around the longitudinal beams 10a, more particularly, the left end portion 431 and the right end portion 432 of the engine mounting member 4 and fixed thereto by welding. Needless to say, the engine mounting member 4 can alternatively be bolt-fixed to the longitudinal beams 10a. With the end portion 52 of the air deflector 5 being fixed, the main body portion 51 of the air deflector 5 extends with a downward slope from the engine 3 side to the gap 24 side. The leading end of the main body portion 51 extends to approach the side wall of the engine 3. Further, in order to suppress inadvertent pivotal movement of the cantilever-wise supported main body portion 51 due to collision with the cooling air current, the main body portion 51 is provided with a trapezoidal shape having progressively increasing width from the leading end toward the end portion 52.

In the instant embodiment, the air deflector 5 has a width which is approximately ½ of the total width of the engine 3 in the vehicle body front/rear direction. With this arrangement, an approximately half of the amount of cooling air current which has flown downwards along the side face of the engine 3 is guided by the air deflector 5 to the gap 24, and the remaining half thereof is reflected by the engine mounting face 40 to be scattered around it. A portion of such scattered cooling air current will flow under the air deflector 5 or toward the engine output shaft 30, thus cooling the bottom of the engine 3. On the other hand, in case there is no need to positively feeding cooling air current to the bottom of the engine 3, the width of the air deflector 5 can be increased by an amount substantially corresponding to the width of the engine in the vehicle body front/rear direction.

The engine employed in the above-described embodiment is of the type in which the engine output shaft 30 projects from the lower face of the engine 3. However, the present invention is applicable also to a type of engine in which the engine output shaft 30 projects from the front face or the rear face of the engine 3.

In the foregoing embodiment, the present invention is applied to a lawn mower. However, the present invention is applicable also to an agricultural work vehicle such as a tractor or a light work vehicle such as a truck, a utility vehicle, etc.

The arrangements disclosed in the above-described embodiments (including the other embodiments) can be used in any desired combination with other arrangements illustrated in the further embodiments as long as such other arrangement is compatible. Further, it should be noted that the embodiments disclosed in the above are only exemplary and the present invention is not limited to these disclosed embodiments, and various modifications and changes can be made within a range not departing from the principal object of the present invention.

The invention claimed is:

1. A work vehicle comprising:
   a vehicle body frame;
   an engine;
   an engine mounting member having an engine mounting face, the engine mounting member being connected to the vehicle body frame;
   an engine hood configured to cover the engine from above, a lower end of the engine hood and the vehicle body frame together forming a gap therebetween; and
   an air deflector configured to change the direction of the cooling air current to guide cooling air flowing downwards along a side face of the engine toward the engine mounting face and to the gap.

2. The work vehicle of claim 1, wherein an engine output shaft projects from a lower face of the engine, and at a center of an engine mounting face of the engine mounting member, there is formed a through hole allowing passage of the engine output shaft therethrough.

3. The work vehicle of claim 2, wherein between the through hole and the engine output shaft, there is formed a gap of such degree as allows avoidance of mutual interference therebetween.

4. The work vehicle of claim 1, wherein the air deflector comprises a plate which is sloped downwards from an engine side to a gap side.

5. The work vehicle of claim 4, wherein:
   the vehicle body frame includes a pair of longitudinal beams comprised of members extending in a vehicle body front/rear direction and cross beams interconnecting them;
   the engine mounting member comprises a plate member bridging the longitudinal beams; and
   one end of the air deflector is partially wound around the longitudinal beams and fixed thereto.

6. The work vehicle of claim 5, wherein the one end of the air deflector is fixed at the gap and the other end of the air deflector is a free end.

7. The work vehicle of claim 6, wherein the one end of the air deflector extends to a side face of a body of the engine.

* * * * *